United States Patent
Miyamoto

(10) Patent No.: US 7,292,605 B2
(45) Date of Patent: Nov. 6, 2007

(54) COMMUNICATIONS SYSTEM AND COMMUNICATION METHOD

(75) Inventor: Keijiro Miyamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1153 days.

(21) Appl. No.: 10/222,250

(22) Filed: Aug. 14, 2002

(65) Prior Publication Data

US 2003/0002535 A1 Jan. 2, 2003

Related U.S. Application Data

(63) Continuation of application No. PCT/JP00/00954, filed on Feb. 18, 2000.

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/485; 370/392; 370/465

(58) Field of Classification Search ........ 370/352–395, 370/400–442, 468–493; 398/25–27, 71, 398/168; 709/230–233, 251–252
See application file for complete search history.

(56) References Cited

U.S. PATENT DOCUMENTS

| | | | |
|---|---|---|---|
| 5,526,346 A * | 6/1996 | Abiven | 370/295 |
| 6,347,096 B1 * | 2/2002 | Profumo et al. | 370/476 |
| 6,498,667 B1 * | 12/2002 | Masucci et al. | 398/98 |
| 6,633,541 B1 * | 10/2003 | Hijikata et al. | 370/231 |
| 6,636,527 B1 * | 10/2003 | Lee et al. | 370/465 |
| 6,731,632 B1 * | 5/2004 | Takahashi et al. | 370/392 |
| 6,731,653 B1 * | 5/2004 | Henderson et al. | 370/490 |
| 6,778,557 B1 * | 8/2004 | Yuki et al. | 370/468 |
| 6,914,909 B2 * | 7/2005 | Van De Voorde et al. | 370/442 |
| 6,931,013 B2 * | 8/2005 | Saikusa | 370/395.4 |
| 7,076,563 B1 * | 7/2006 | Yamanaka et al. | 709/233 |
| 2002/0085583 A1 * | 7/2002 | Kasa et al. | 370/449 |
| 2005/0220149 A1 * | 10/2005 | Van De Voorde et al. | 370/498 |

FOREIGN PATENT DOCUMENTS

| | | |
|---|---|---|
| JP | 4-90232 | 3/1992 |
| JP | 11-074922 | 3/1999 |

* cited by examiner

*Primary Examiner*—Man U. Phan
(74) *Attorney, Agent, or Firm*—Katten Muchin Rosenman LLP

(57) ABSTRACT

Communications system and communication method which control group communication processes in a more efficient and flexible way. A downstream frame generation means produces a downstream frame for group communication, providing group communication time slots therein. An office-side group communication control means controls communications processes by sending the downstream frame and receiving an upstream frame. An upstream frame generation means produces an upstream frame. A subscriber-side group communication control means controls the group communication processes by sending the upstream frame and receiving the downstream frame.

12 Claims, 18 Drawing Sheets

COMMUNICATIONS SYSTEM AND COMMUNICATION METHOD

This application is a continuing application, filed under 35 U.S.C. §111(a), of International Application PCT/JP00/00954, filed Feb. 18, 2000.

BACKGROUND OF THE INVENTION

1. Field of the Invention

The present invention relates to a communications system and a communication method. More particularly, the present invention relates to a communications system which enables communication between a central office and subscriber premises, and a communication method which enables communication between a central office and subscriber premises.

2. Description of the Related Art

A variety of telecommunication services are provided today, along with the growing needs for such systems as video on demand, cable TV, and high-speed access to computer networks. The development of subscriber access communications systems is thus underway to directly interconnect subscriber premises and central offices having databases for such services.

FIG. 17 is a diagram showing the structure of a subscriber access communications system. Termination unit 70-1 to 70-n are each disposed in subscribers' premises 700-1 to 700-n, respectively, while a line terminal 60 is disposed in a central office 600.

Each termination unit 70-1 to 70-n is linked to telephone sets, TV, personal computers, and other equipment. The line terminal 60 is linked to those termination units 70-1 to 70-n via a splitter 30 and a transmission medium.

Downstream information (downstream frames), directed from the central office 600 to the subscriber premises 700-1 to 700-n, is transported first through a single transmission line and then through a plurality of branching transmission lines via a splitter 30.

Upstream information (upstream frames) originating from the subscriber premises 700-1 to 700-n to the central office 600 is first transported over the individual branches and then combined into a single transmission lines via the splitter 30.

When broadcasting information in the above-described conventional subscriber access communications system, the line terminal 60 produces a downstream frame for this purpose by duplicating the data as many times as the number of termination units for which it is destined. Each copy of the data is then inserted to a particular time slot that is pre-assigned to every termination unit. The line terminal 60 sends out the downstream frame produced in this way.

FIG. 18 is a diagram outlining the process of copying data. The downstream frame is designed to have as many time slots as the number of termination units. The individual termination units 70-1 to 70-n are associated with those time slots TS1 to TSn, respectively. When sending data, the line terminal 60 produces n copies of that data and enters them into the time slots of a downstream frame.

The trouble is that the above process of creating and sending downstream frames for broadcasting is inefficient because the conventional system requires that the data be copied as many times as the number of termination units belonging to a group.

Another problem of the conventional system lies in the lack of flexibility in group communication control in the case the termination units 70-1 to 70-n are divided into a plurality of groups.

SUMMARY OF THE INVENTION

In view of the foregoing, it is an object of the present invention to provide a communications system which controls communication processes in a more efficient and flexible way.

It is another object of the present invention to provide a communication method which controls communication processes in a more efficient and flexible way.

To accomplish the above objects, the present invention provides a communications system which enables communication between a central office and subscribers. This system comprises: a line terminal and a plurality of termination units. The line terminal comprises: a downstream frame generation means for producing a downstream frame for group communication, with a group communication time slot provided therein, and an office-side group communication control means for controlling group communication processes by sending the downstream frame and receiving an upstream frame. Each of the termination unit, on the other hand, comprises: an upstream frame generation means for producing the upstream frame, and a subscriber-side group communication control means for controlling the group communication processes by sending the upstream frame and receiving the downstream frame.

The present invention also provides a communication method which enables communication between a central office and subscribers. This method comprises the steps of: producing and sending a downstream frame for group communication, with a group communication time slot provided therein; receiving and processing the downstream frame; producing and sending an upstream frame with a group communication response time slot; and receiving and processing the upstream frame, thereby controlling group communication processes.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
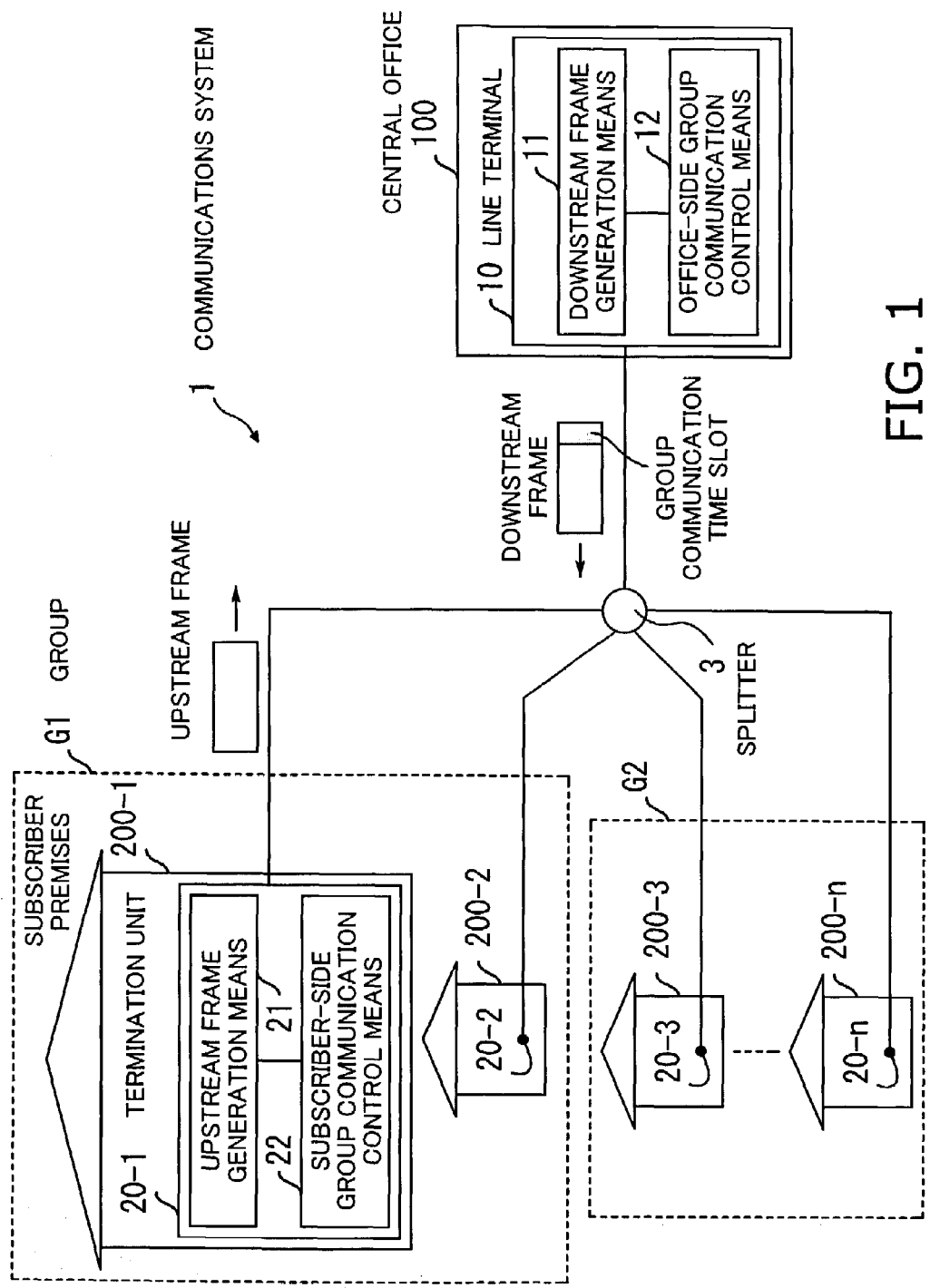
FIG. 1 is a conceptual view of a communications system according to the present invention.

Several embodiments of the present invention will be described below with reference to the drawings. FIG. 1 is a conceptual view of a communications system according to the present invention. This communications system 1 has a line terminal 10 located in a central office 100, as well as termination units 20-1 to 20-n disposed in subscriber premises 200-1 to 200-n, thus enabling communication between the central office 100 and subscriber premises 200-1 to 200-n.

Each termination unit 20-1 to 20-n is linked to telephone sets, TV, personal computers, and other equipment (not shown). The line terminal 10 is linked to those termination unit 20-1 to 20-n via a splitter 3 and a transmission medium such as fiber optic cables.

The communications system 1 according to the present invention provides group communication services. In the present invention, the termination units 20-1 to 20-n are divided into groups, and the term "group communication" refers to such a type of communication where the line terminal 10 broadcasts information to the termination units that belong to a particular group.

Consider, for example, two termination units 20-1 and 20-2 form one group G1, and the other termination units 20-3 to 20-n form another group G2. Then the termination units 20-1 and 20-2 and line terminal 10 can communicate within the closed group G1. Likewise, the termination units 20-3 to 20-n and line terminal 10 can communicate within the closed group G2. It would also be possible to define a single group that includes all the termination units 20-1 to 20-n.

In the line terminal 10, a downstream frame generation means 11 produces downstream frames for group communication, providing a group communication time slot therein. The structure of those downstream frames will be discussed in detail later. An office-side group communication control means 12 controls group communication processes by sending downstream frames, as well as receiving upstream frames sent from the termination units 20-1 to 20-n.

In each termination unit 20-1 to 20-n, an upstream frame generation means 21 produces upstream frames. The structure of those upstream frames will be discussed in detail later. A subscriber-side group communication control means 22 controls group communication processes by sending upstream frames and receiving downstream frames.

Figure 2:
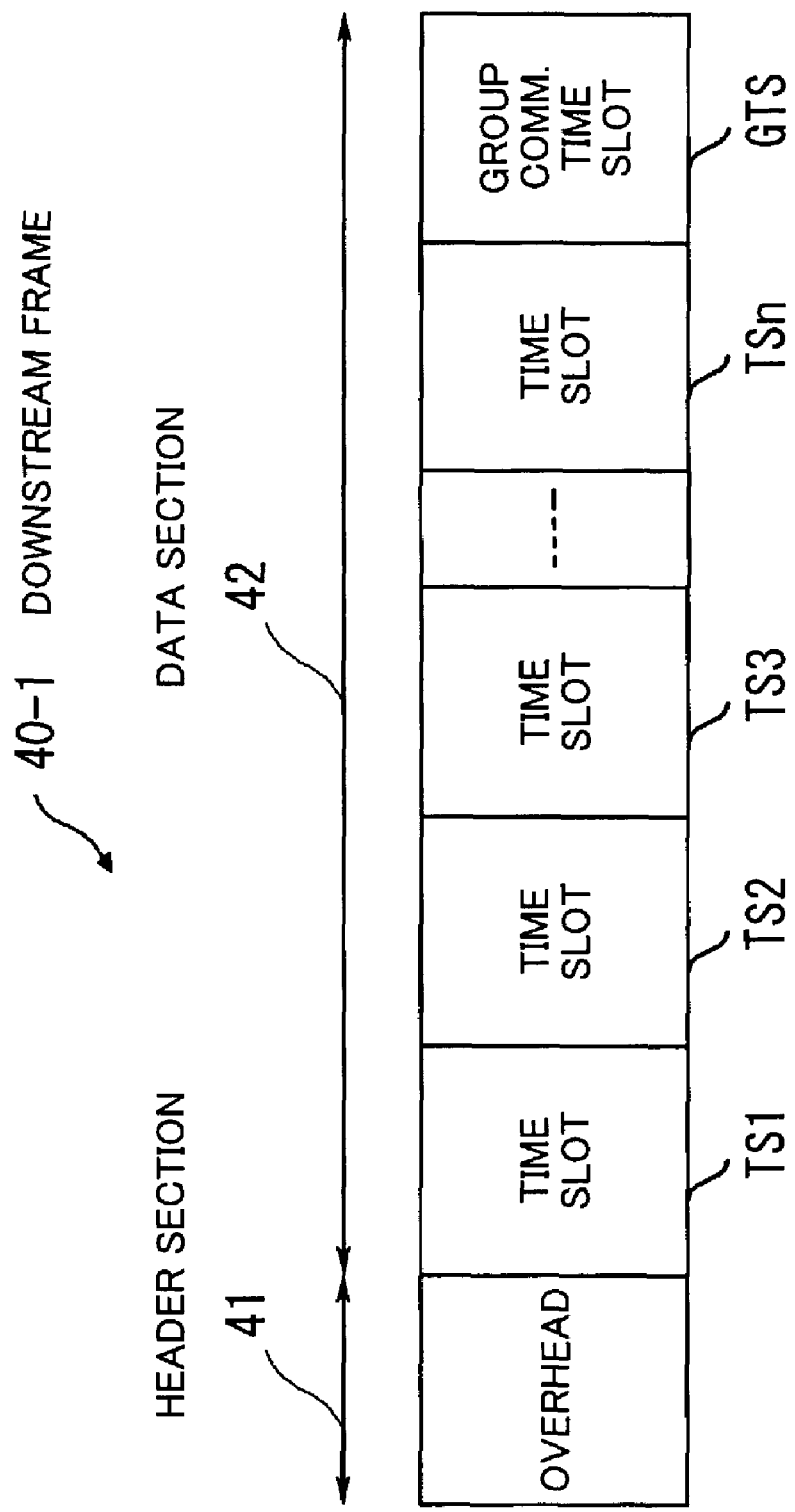
FIG. 2 is a diagram showing the structure of a downstream frame.

A first embodiment of the communications system 1 according to the present invention will now be described below. FIG. 2 is a diagram showing the structure of a downstream frame. This downstream frame 40-1 has a header section 41 and a data section 42. The header section 41 accommodates control information called "overhead." The data section 42 has as many time slots TS1 to TSn as it can accommodate all termination units 20-1 to 20-n. That is, the time slots TS1 to TSn are associated with the termination units 20-1 to 20-n, respectively. Also provided in the data section 42 is a group communication time slot GTS, the time slot for the line terminal 10 to broadcast data to a plurality of termination units belonging to a specific group.

Figure 3:
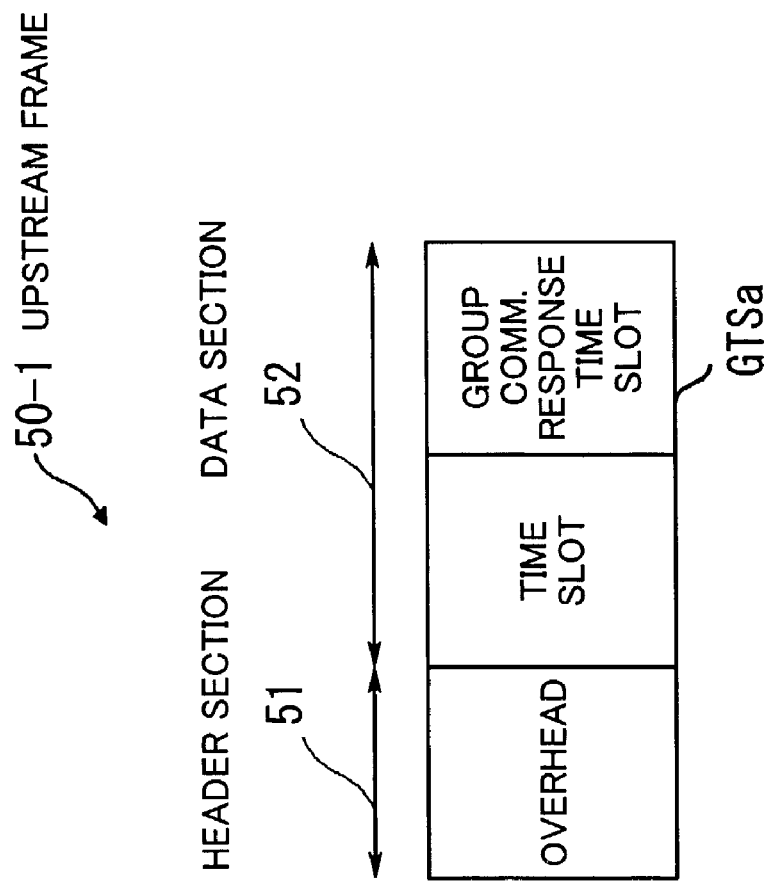
FIG. 3 is a diagram showing the structure of an upstream frame.

FIG. 3 is a diagram showing the structure of an upstream frame. This upstream frame 50-1 has a header section 51 and a data section 52. The header section 51 accommodates control information called "overhead." The data section 52 has time slots assigned to the individual termination units, and in addition a group communication response time slot GTSa for use in response to the content of the group communication time slot GTS.

Figure 4:
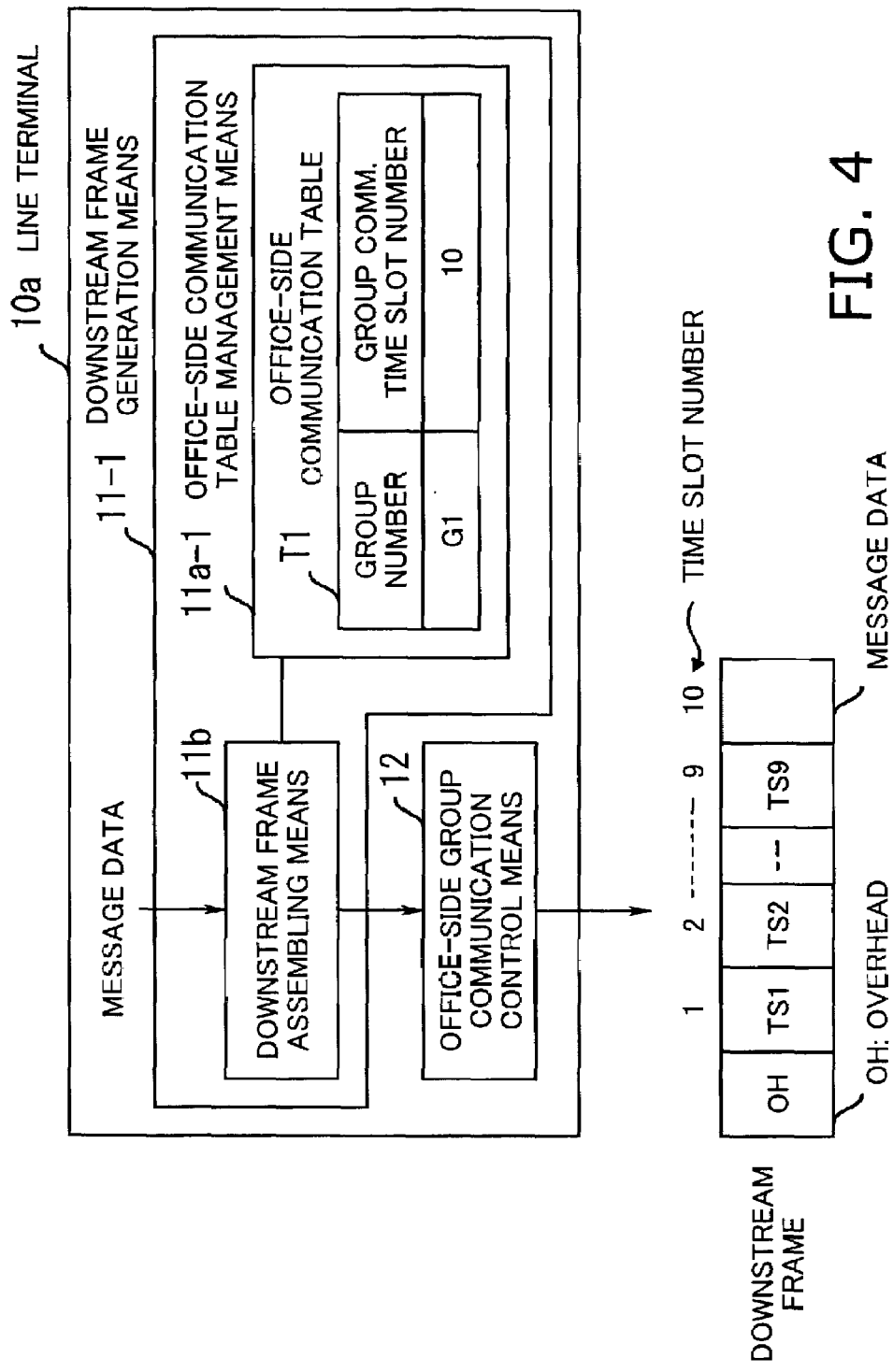
FIG. 4 is a diagram showing the structure of a line terminal.

FIG. 4 is a diagram showing the structure of a line terminal. This line terminal 10a according to the first embodiment has a downstream frame generation means 11-1 and an office-side group communication control means 12. The downstream frame generation means 11-1 has an office-side communication table management means 11a-1 and a downstream frame assembling means 11b.

The office-side communication table management means 11a-1 manages an office-side communication table T1. The office-side communication table T1 has a group number field and a group communication time slot number field. The drawing illustrates an entry whose group number is "G1" and group communication time slot number is "10." The downstream frame assembling means 11b assembles downstream frames for group communication, consulting the office-side communication table T1. More specifically, it recognizes the time slot with a time slot number of "10" as the group communication time slot and thus enters message data into that time slot. The office-side group communication control means 12 sends out such downstream frames produced by the downstream frame generation means 11-1.

Figure 5:
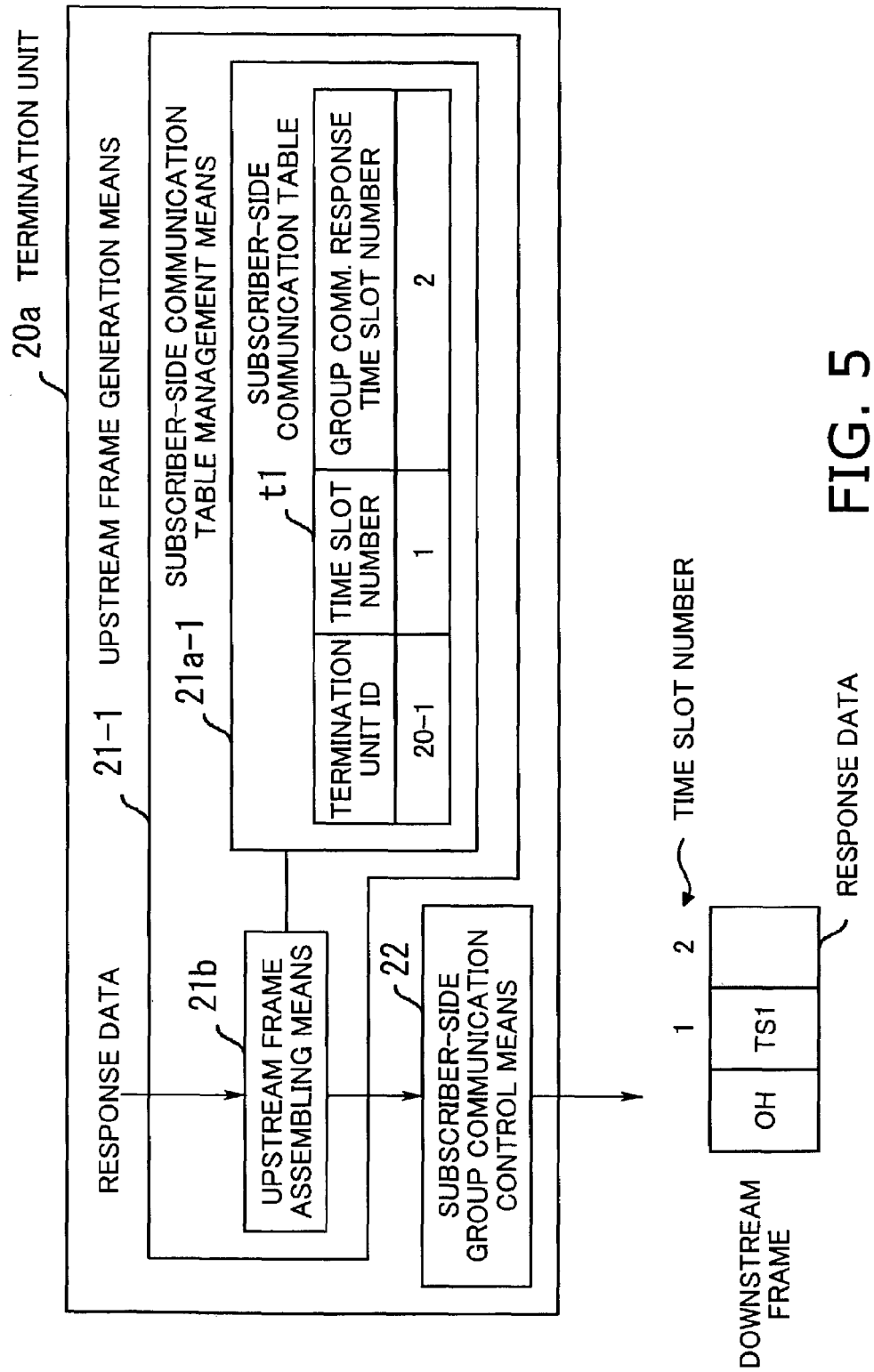
FIG. 5 is a diagram showing the structure of a termination unit.

FIG. 5 is a diagram showing the structure of a termination unit. This termination unit 20a according to the first embodiment has an upstream frame generation means 21-1 and a subscriber-side group communication control means 22. The upstream frame generation means 21-1 has a subscriber-side communication table management means 21a-1 and an upstream frame assembling means 21b.

The subscriber-side communication table management means 21a-1 manages a subscriber-side communication table t1. This subscriber-side communication table t1 has the following data fields: termination unit ID, time slot number (time slot number assigned to the termination unit 20a itself), and group communication response time slot number. The diagram illustrates an entry whose termination unit ID is "20-1," time slot number is "1," and group communication response time slot number is "2." The upstream frame assembling means 21b assembles upstream frames for group communication, consulting the subscriber-side communication table t1. More specifically, it recognizes the time slot with a time slot number of "2" as the group communication response time slot and thus enters response data into that time slot. The subscriber-side group communication control means 22 sends out such upstream frames produced by the upstream frame generation means 21-1.

As described above, the communications system according to the first embodiment of the present invention is configured to control group communication processes by producing downstream frames with a group communication time slot and upstream frames with a group communication response time slot.

The above arrangement eliminates the need for duplicating as many data instances as the number of termination units in a group, unlike conventional group communications. The present invention simplifies the processing, thus making group communications more efficient.

While the above-described system is designed to send upstream frames with a group communication response time slot from the termination unit 20a, such a group communication response time slot may not be present in upstream frames if the broadcast message from the line terminal 10a does not need response.

A second embodiment of the communications system 1 according to the present invention will now be described below. The second embodiment controls such group communication processes where the termination units 20-1 to 20-n are divided into a plurality of groups, allowing communication sessions to take place concurrently in those groups.

Figure 6:
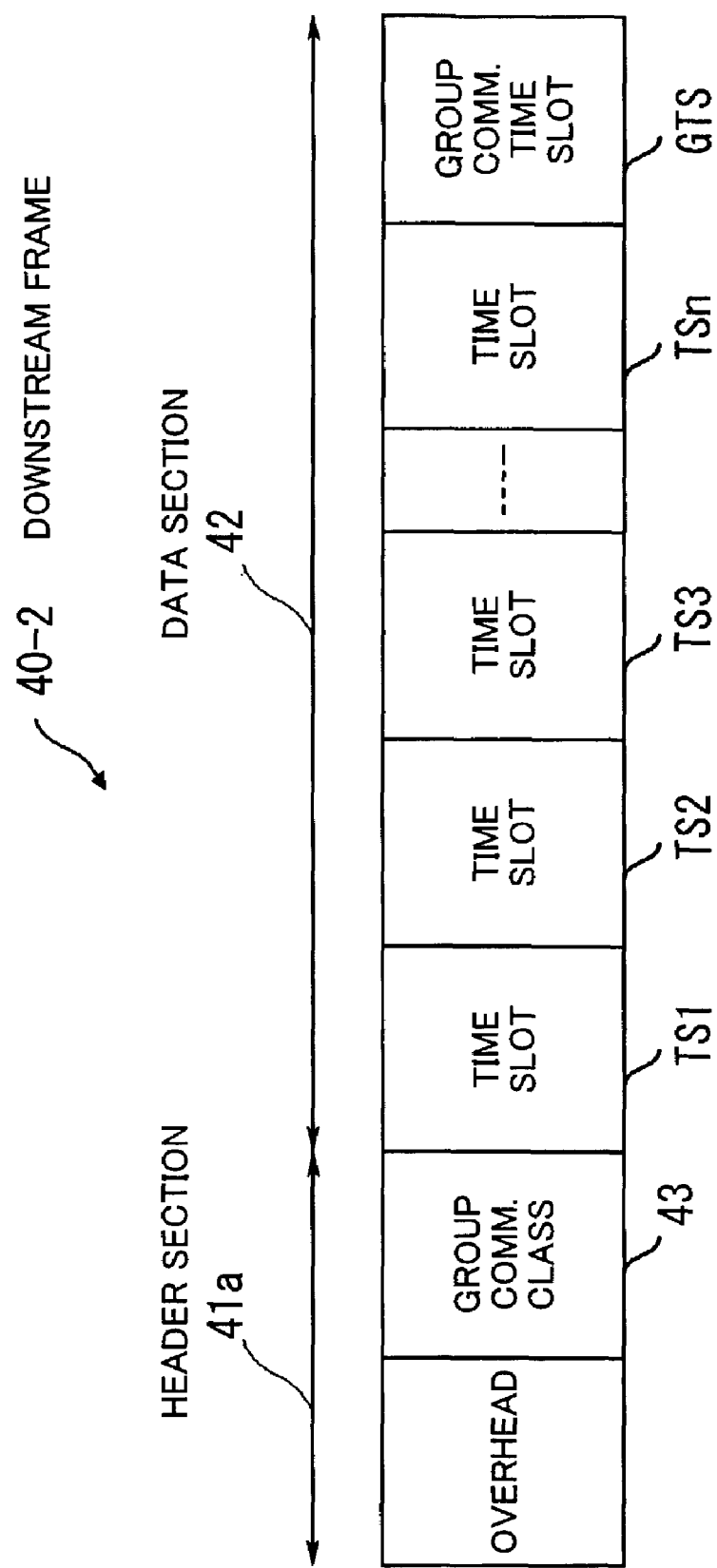
FIG. 6 is a diagram showing the structure of a downstream frame.

FIG. 6 is a diagram showing the structure of a downstream frame. This downstream frame 40-2 has a header section 41a and a data section 42. The header section 41a has a group communication class field 43, along with control information called "overhead." More specifically, this group communication class field 43 contains a group identifier that is used to distinguish one group from others. Consider, for example, that there are two groups having group identifiers "A" and "B," respectively. The line terminal transmits downstream frames with the identifier "A" or "B" in the group communication class field 43, thereby being able to interact with the two groups.

Figure 7:
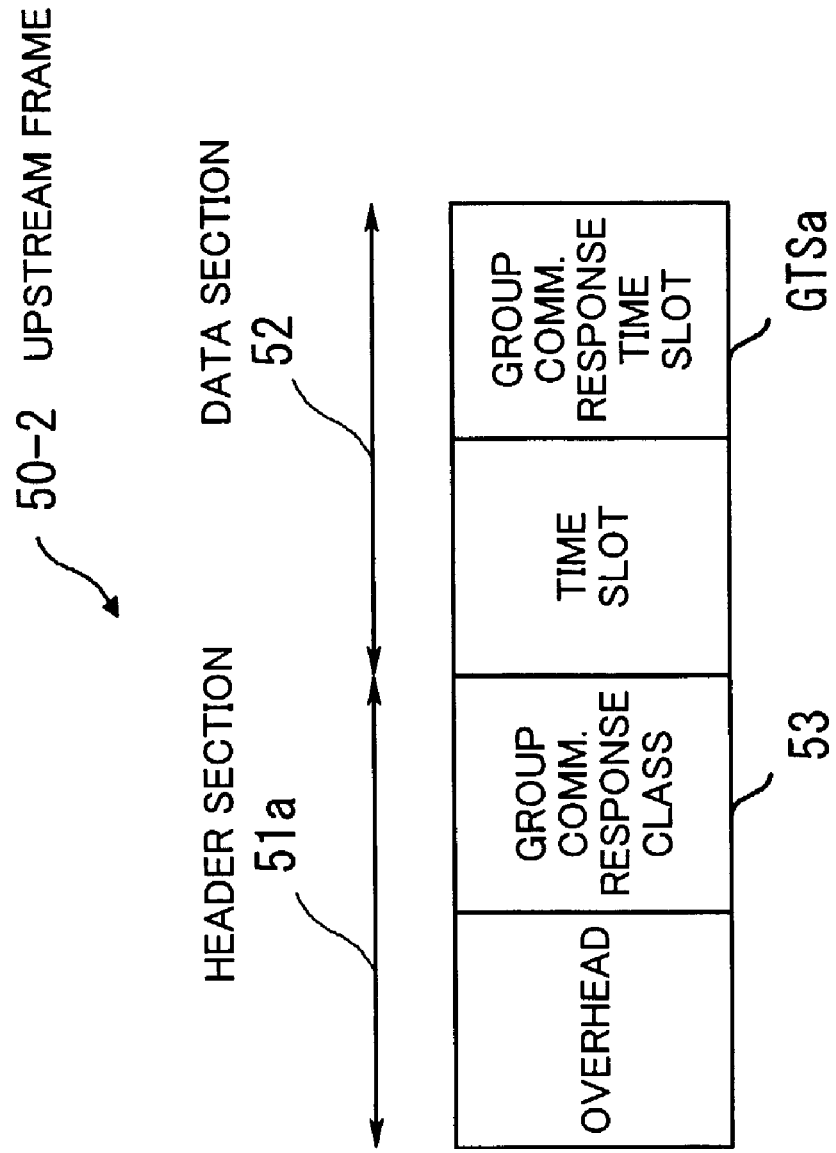
FIG. 7 is a diagram showing the structure of an upstream frame.

FIG. 7 is a diagram showing the structure of an upstream frame. This upstream frame 50-2 has a header section 51a and a data section 52. The header section 51a has a group communication response class field 53, besides carrying control information called "overhead." The group communication response class field 53 contains a group identifier that indicates to which group the sender belongs. This is common to the set of group identifiers used to specify a group in the group communication class field 43.

Figure 8:
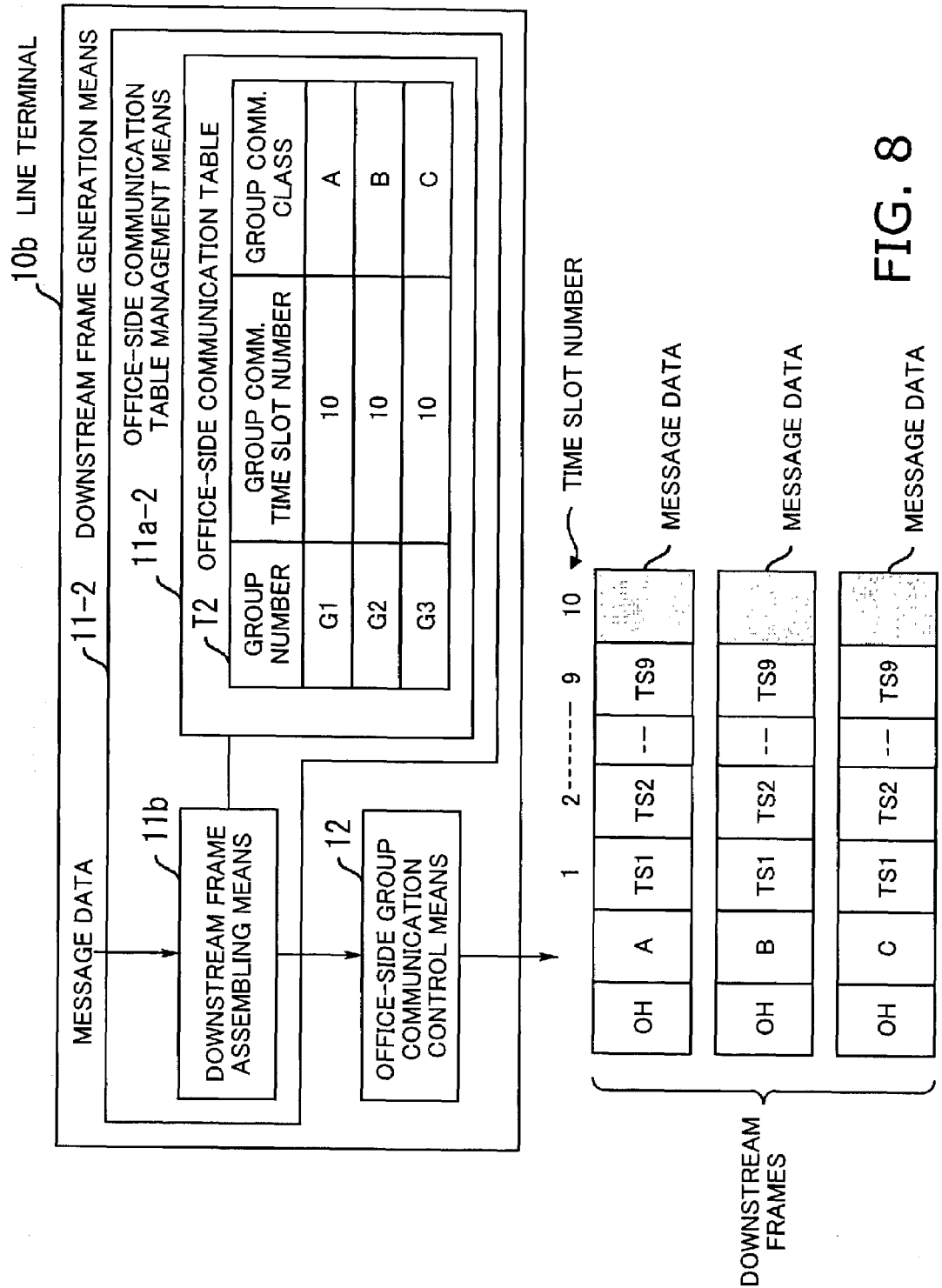
FIG. 8 is a diagram showing the structure of a line terminal.

FIG. 8 is a diagram showing the structure of a line terminal. This line terminal 10b according to the second embodiment has a downstream frame generation means 11-2 and an office-side group communication control means 12. The downstream frame generation means 11-2 has an office-side communication table management means 11a-2 and a downstream frame assembling means 11b.

The office-side communication table management means 11a-2 manages an office-side communication table T2. This office-side communication table T2 has the following fields: group number, group communication time slot number, and group communication class. The drawing illustrates three group entries, one of which has a group number "G1," a group communication time slot number "10," and a group communication class "A." The downstream frame assembling means 11b assembles downstream frames for group communication, consulting the office-side communication table T2. More specifically, it assembles a downstream frame addressed to group G1 by entering "A" to the group communication class field 43 and filling in the time slot specified by the time slot number "10" with the message data intended for that group G1.

Likewise, the downstream frame assembling means 11b assembles a downstream frame addressed to group G2 by entering "B" to the group communication class field 43 and filling in the time slot specified by the time slot number "10" with the message data for that group G2.

Further, the downstream frame assembling means 11b assembles a downstream frame addressed to group G3 by entering "C" to the group communication class field 43 and filling in the time slot specified by the time slot number "10" with the message data for that group G3. The office-side group communication control means 12 sends out such downstream frames produced by the downstream frame generation means 11-2.

Figure 9:
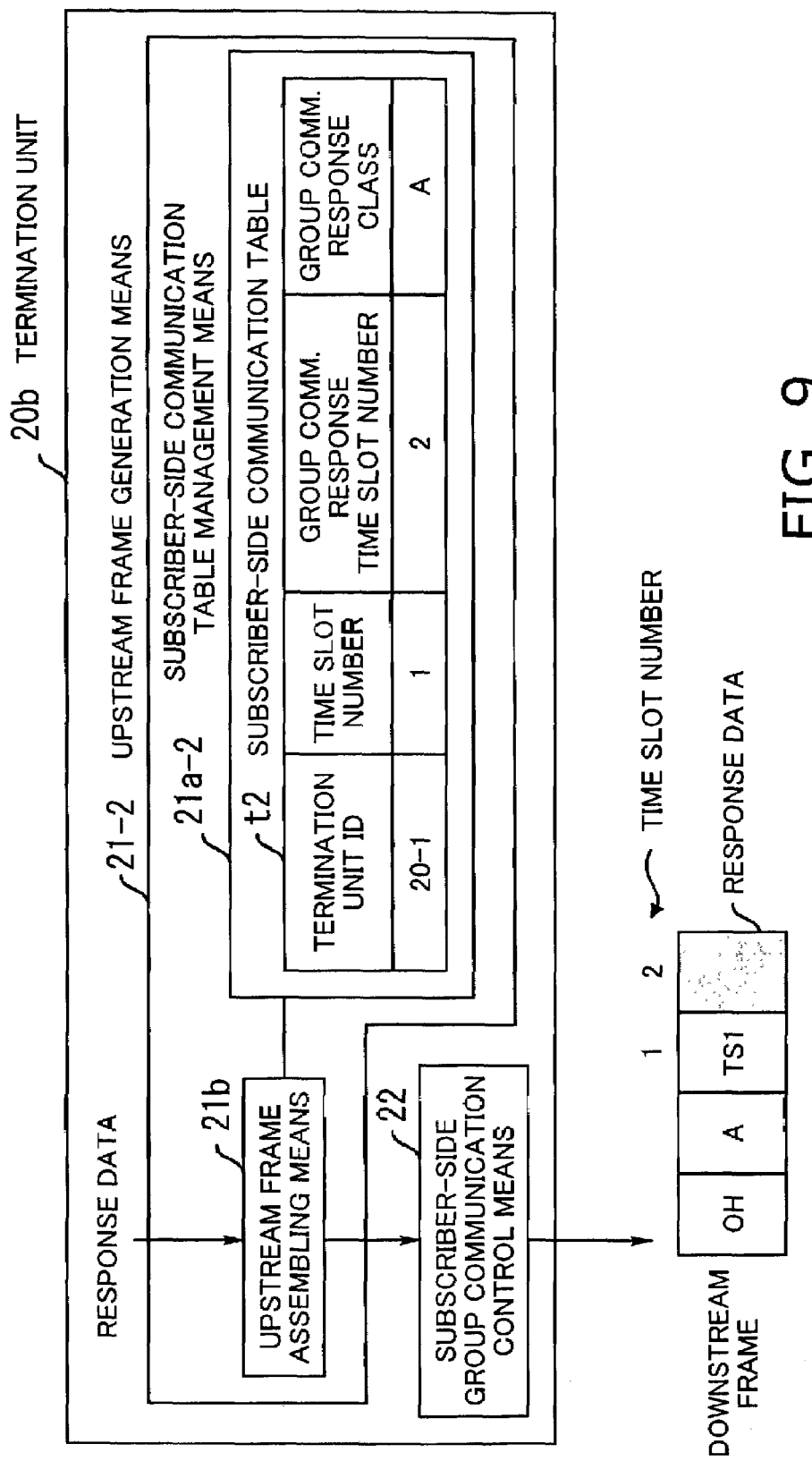
FIG. 9 is a diagram showing the structure of a termination unit.

FIG. 9 is a diagram showing the structure of a termination unit. This termination unit 20b according to the second embodiment has an upstream frame generation means 21-2 and a subscriber-side group communication control means 22. The upstream frame generation means 21-2 has a subscriber-side communication table management means 21a-2 and an upstream frame assembling means 21b.

The subscriber-side communication table management means 21a-2 manages a subscriber-side communication table t2. This subscriber-side communication table t2 has the following fields: termination unit ID, time slot number (time slot number assigned to the termination unit 20b itself), group communication response time slot number, and group communication response class. The diagram illustrates an entry whose termination unit ID is "20-1," time slot number is "1," group communication response time slot number is "2," and group communication response class is "A." The upstream frame assembling means 21b assembles upstream frames for group communication, consulting the subscriber-side communication table t2. More specifically, it assembles an upstream frame by entering "A" to the group communication response class field 53 and filling in the time slot specified by the time slot number "2" with response data. The subscriber-side group communication control means 22 sends out such upstream frames produced by the upstream frame generation means 21-2.

As described above, the communications system according to the second embodiment of the present invention is configured to control group communication processes by employing a group communication class field 43 in downstream frames and a group communication response class field 53 in upstream frames. This arrangement permits a plurality of groups to communicate more efficiently, thus improving the flexibility of group communication services.

A third embodiment of the communications system 1 according to the present invention will now be described below. The third embodiment differs from the second embodiment in that it offers a plurality of group communication time slots.

Figure 10:
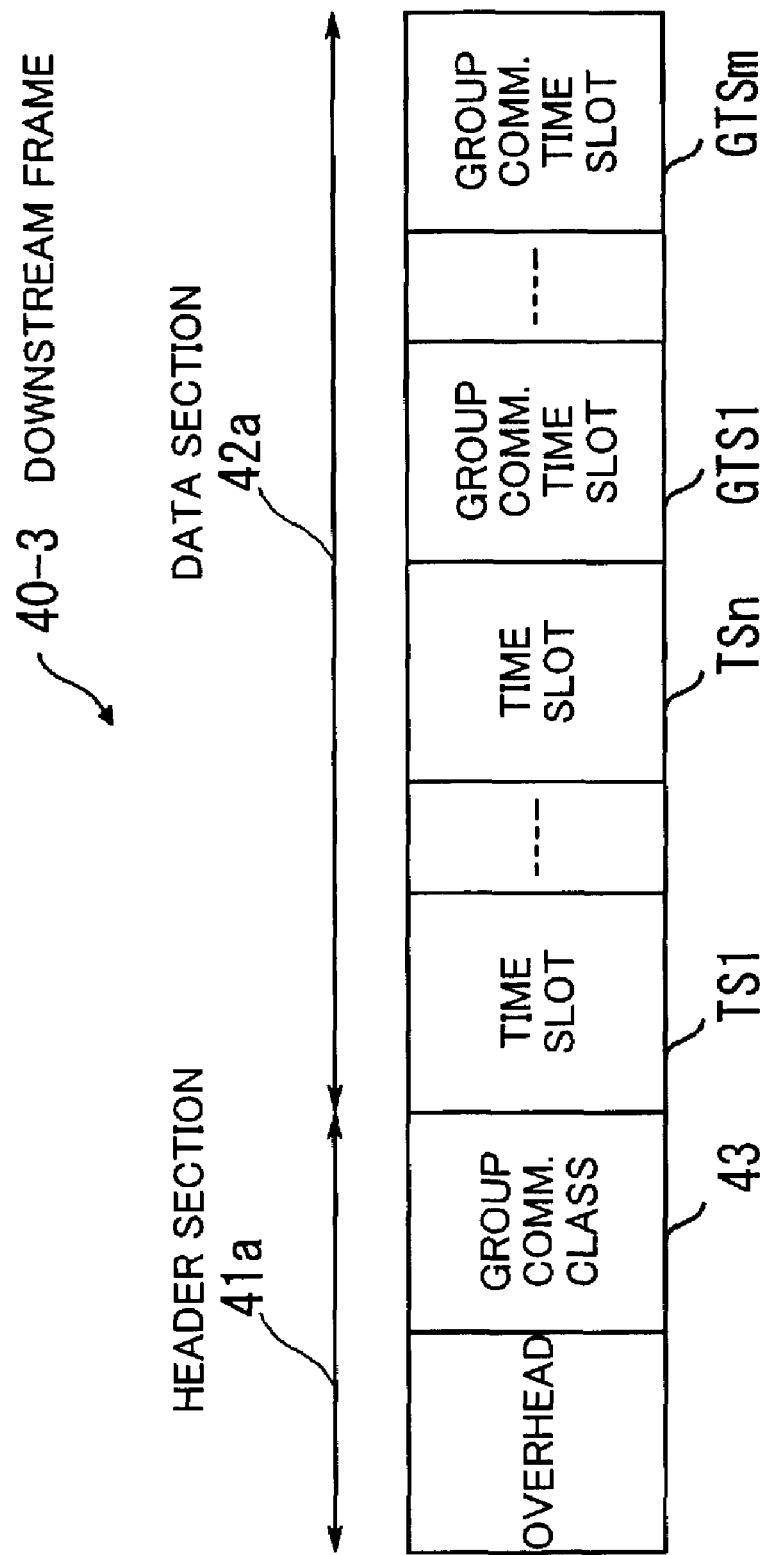
FIG. 10 is a diagram showing the structure of a downstream frame.

FIG. 10 is a diagram showing the structure of a downstream frame. This downstream frame 40-3 has a header section 41a and a data section 42a. A part of the data section 42a is allocated to a plurality of group communication time slots GTS1 to GTSm. An improved flexibility in group communication is provided by allocating plurality of group communication time slots to one group in this way.

Figure 11:
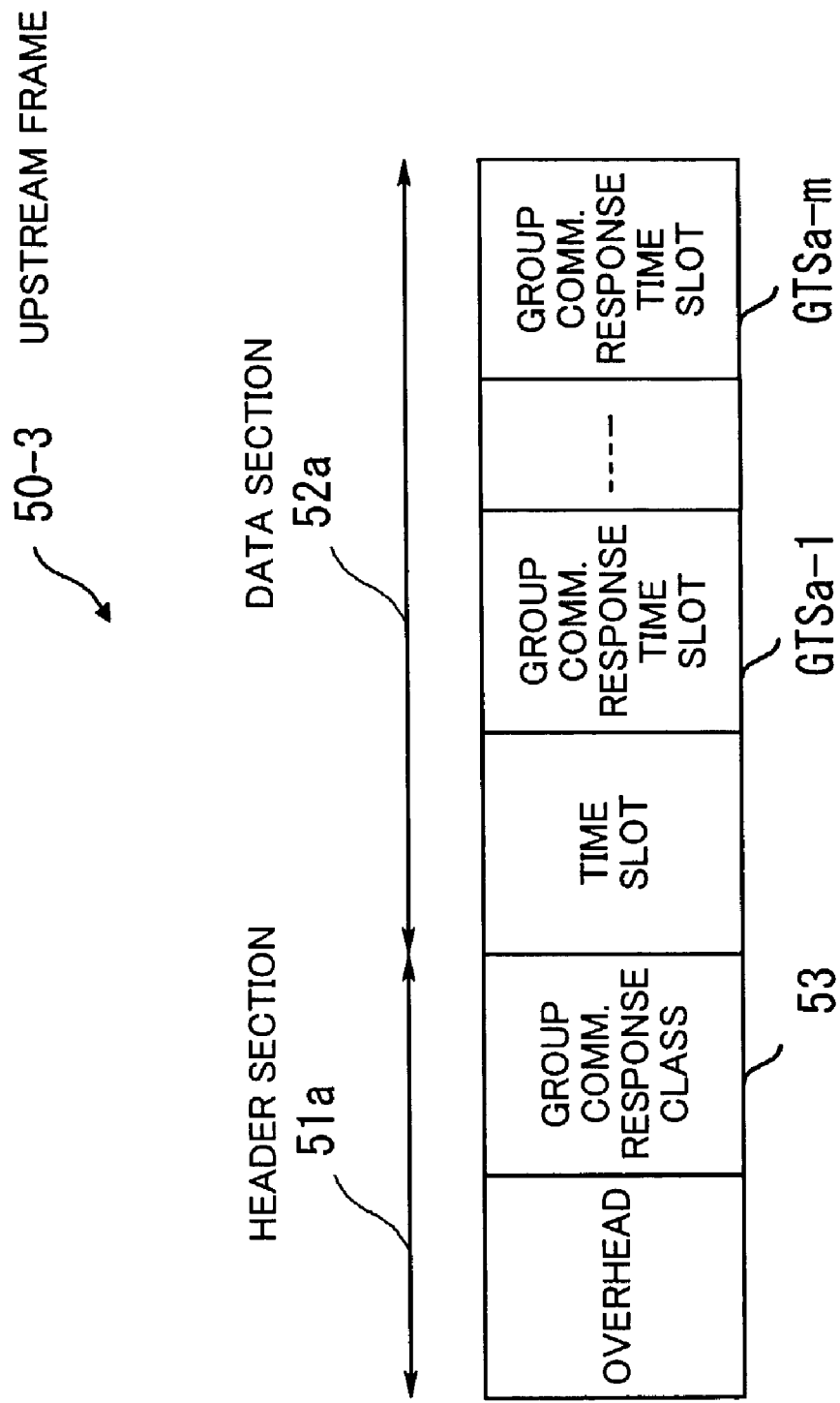
FIG. 11 is a diagram showing the structure of an upstream frame.

FIG. 11 is a diagram showing the structure of an upstream frame. This upstream frame 50-3 has a header section 51a and a data section 52a. A part of the data section 52a is allocated to a plurality of group communication response time slots GTSa-1 to GTSa-m.

Figure 12:
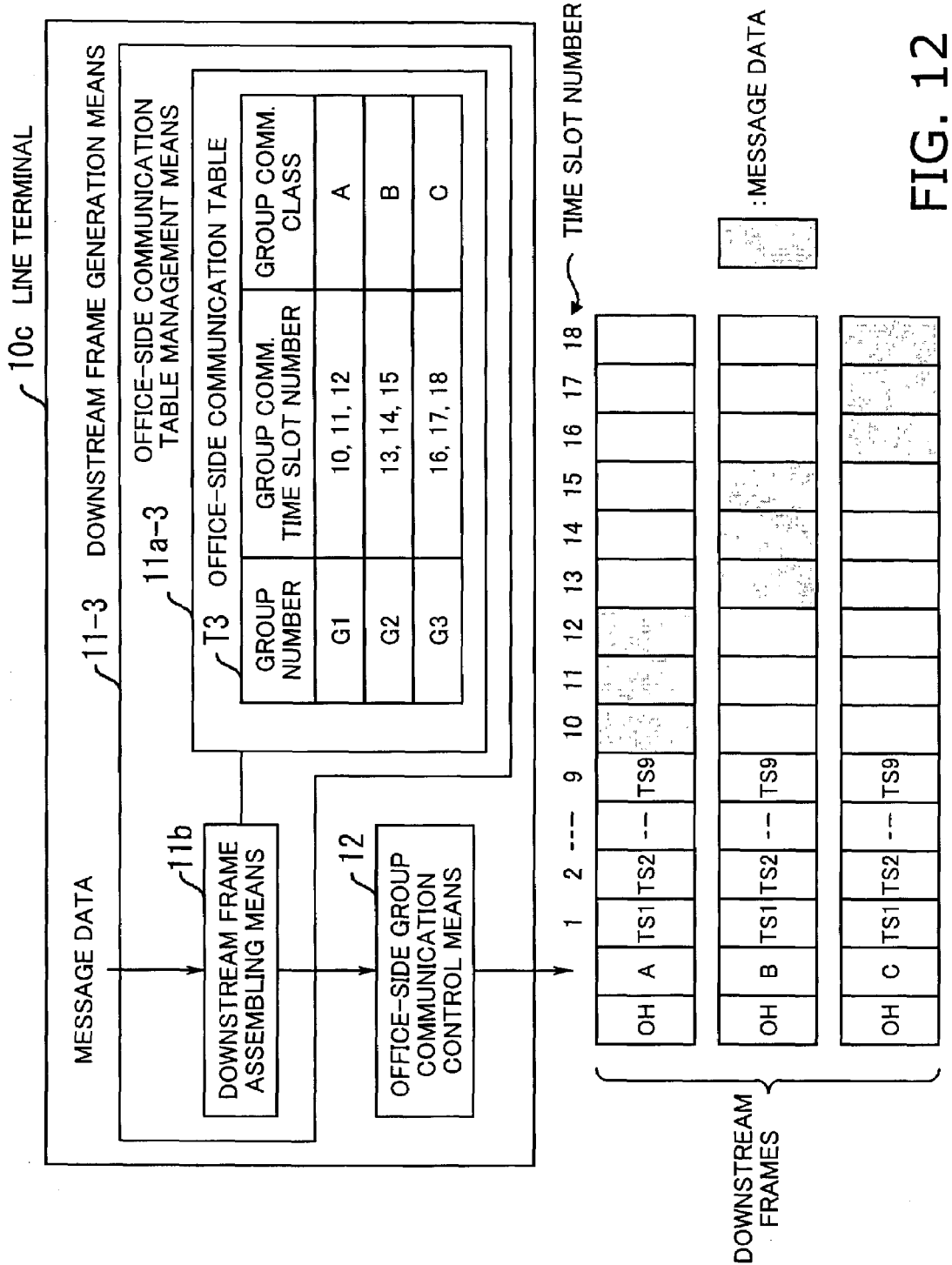
FIG. 12 is a diagram showing the structure of a line terminal.

FIG. 12 is a diagram showing the structure of a line terminal. This line terminal 10c according to the third embodiment has a downstream frame generation means 11-3 and an office-side group communication control means 12. The downstream frame generation means 11-3 has an office-side communication table management means 11a-3 and a downstream frame assembling means 11b.

The office-side communication table management means 11a-3 manages an office-side communication table T3. This office-side communication table T3 has the following fields: group number, group communication time slot number, and group communication class. The diagram illustrates three group entries, one of which has a group number "G1," group communication time slot numbers "10, 11, 12," and a group communication class "A." The downstream frame assembling means 11b assembles downstream frames for group communication, consulting the office-side communication table T3. More specifically, it assembles a downstream frame addressed to group G1 by entering "A" to the group communication class field 43 and filling in three time slots specified by the time slot numbers "10," "11," and "12" with the message data intended for that group G1.

Likewise, the downstream frame assembling means 11b assembles a downstream frame addressed to group G2 by entering "B" to the group communication class field 43 and filling in three time slots specified by the time slot numbers "13," "14," and "15" with the message data intended for that group G2.

Further, the downstream frame assembling means 11b assembles a downstream frame addressed to group G3 by entering "C" to the group communication class field 43 and filling in three time slots specified by the time slot numbers "16," "17," and "18" with the message data intended for that group G3. The office-side group communication control means 12 sends out such downstream frames produced by the downstream frame generation means 11-3.

Figure 13:
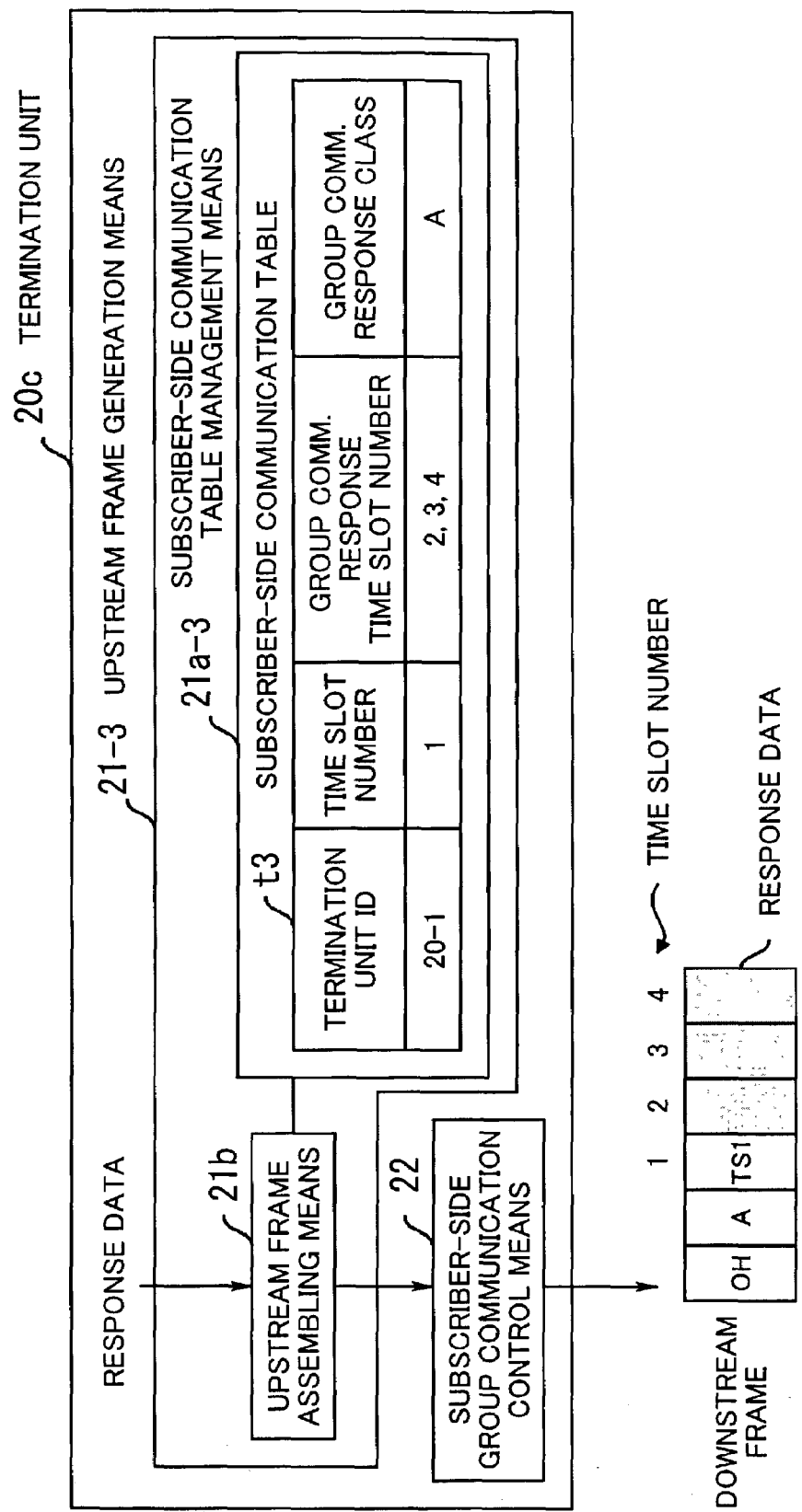
FIG. 13 is a diagram showing the structure of a termination unit.

FIG. 13 is a diagram showing the structure of a termination unit. This termination unit 20c according to the third embodiment has an upstream frame generation means 21-3 and a subscriber-side group communication control means 22. The upstream frame generation means 21-3 has a subscriber-side communication table management means 21a-3 and an upstream frame assembling means 21b.

The subscriber-side communication table management means 21a-3 manages a subscriber-side communication table t3. This subscriber-side communication table t3 has the following fields: termination unit ID, time slot number (time slot number assigned to the termination unit 20c itself), group communication response time slot number, and group communication response class. The diagram illustrates an entry whose termination unit ID is "20-1," time slot number is "1," group communication response time slot numbers are "2, 3, 4," and group communication response class is "A." The upstream frame assembling means 21b assembles upstream frames for group communication, consulting the subscriber-side communication table t3. More specifically, it assembles an upstream frame by entering "A" to the group communication response class field 53 and filling in three time slots specified by the time slot numbers "2, 3, 4" with response data. The subscriber-side group communication control means 22 sends out such upstream frames produced by the upstream frame generation means 21-3.

As described above, the communications system according to the third embodiment is configured to have a plurality of group communication time slots and group communication response time slots. This arrangement permits a plurality of groups to communicate more efficiently, thus improving the flexibility of group communication services.

Figure 14:
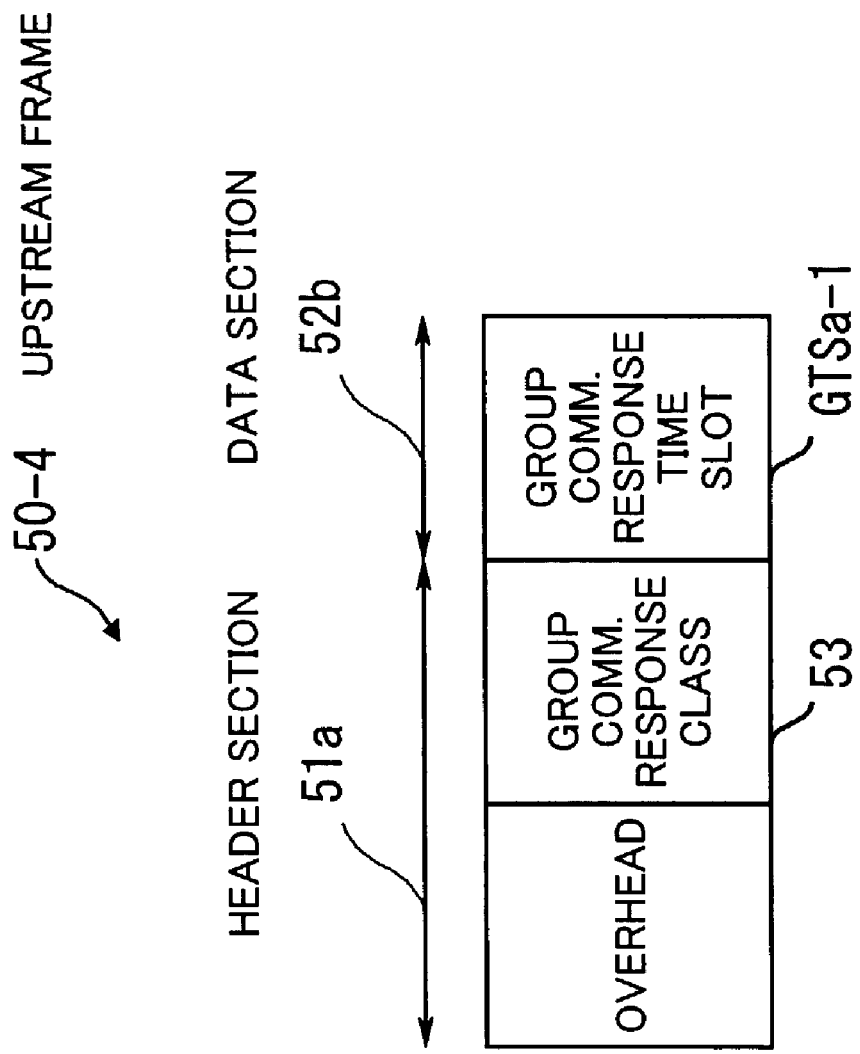
FIG. 14 is a diagram showing a variation of an upstream frame.

A variation of an upstream frame will now be described below. FIG. 14 is a diagram showing a variation of an upstream frame. The upstream frame generation means 21 produces this upstream frame 50-4 when non-group communication does not take place.

This upstream frame 50-4 has a header section 51a and a data section 52b. The header section 51a has a group communication response class field 53, besides carrying overhead information. The data section 52b contains no private time slots for the termination unit itself, but consists solely of a group communication response time slot GTSa-1. The elimination of unnecessary time slots makes group communications more efficient.

Figure 15:
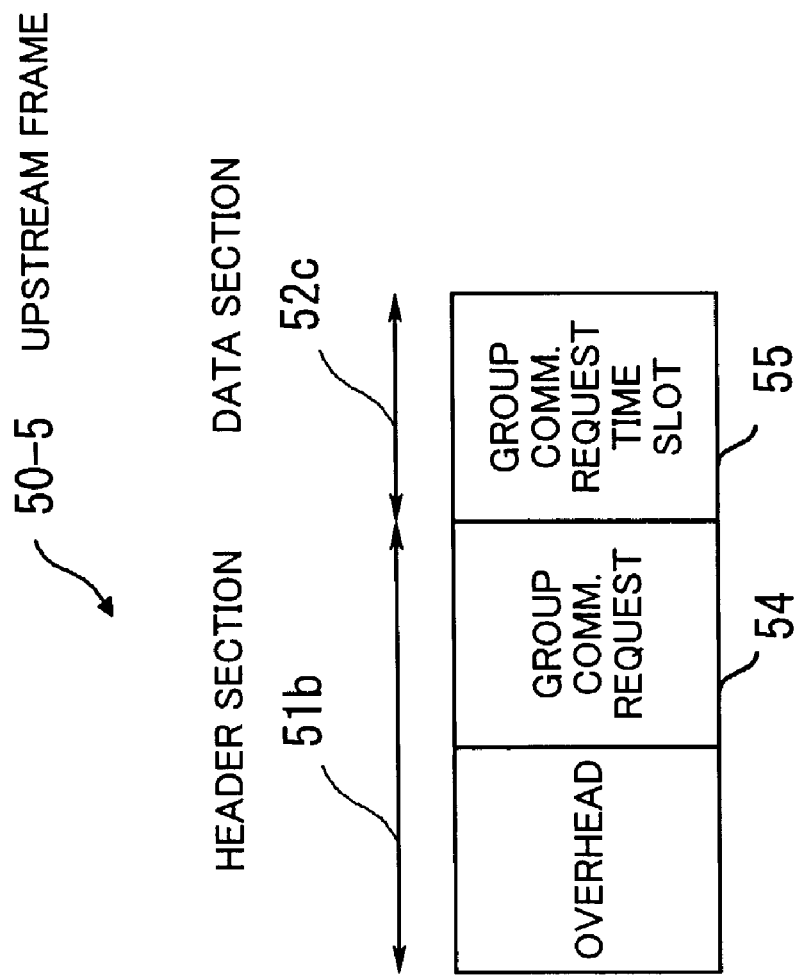
FIG. 15 is a diagram showing another variation of an upstream frame.

FIG. 15 is a diagram showing another variation of an upstream frame. The upstream frame generation means 21 produces this upstream frame 50-5 when the termination unit 20-1 to 20-n needs to send a communication request.

The upstream frame 50-5 has a header section 51b and a data section 52c. The header section 51b has a group communication request field 54, besides carrying overhead information. The data section 52c has a group communication request time slot 55. The group communication request field 54 indicates whether to initiate a group communication session, while the group communication request time slot 55 contains necessary information for the session. This group communication request time slot 55 permits the termination units 20-1 to 20-n to request the line terminal 10 to commence a group communication session, thus making group communication control more flexible.

Figure 16:
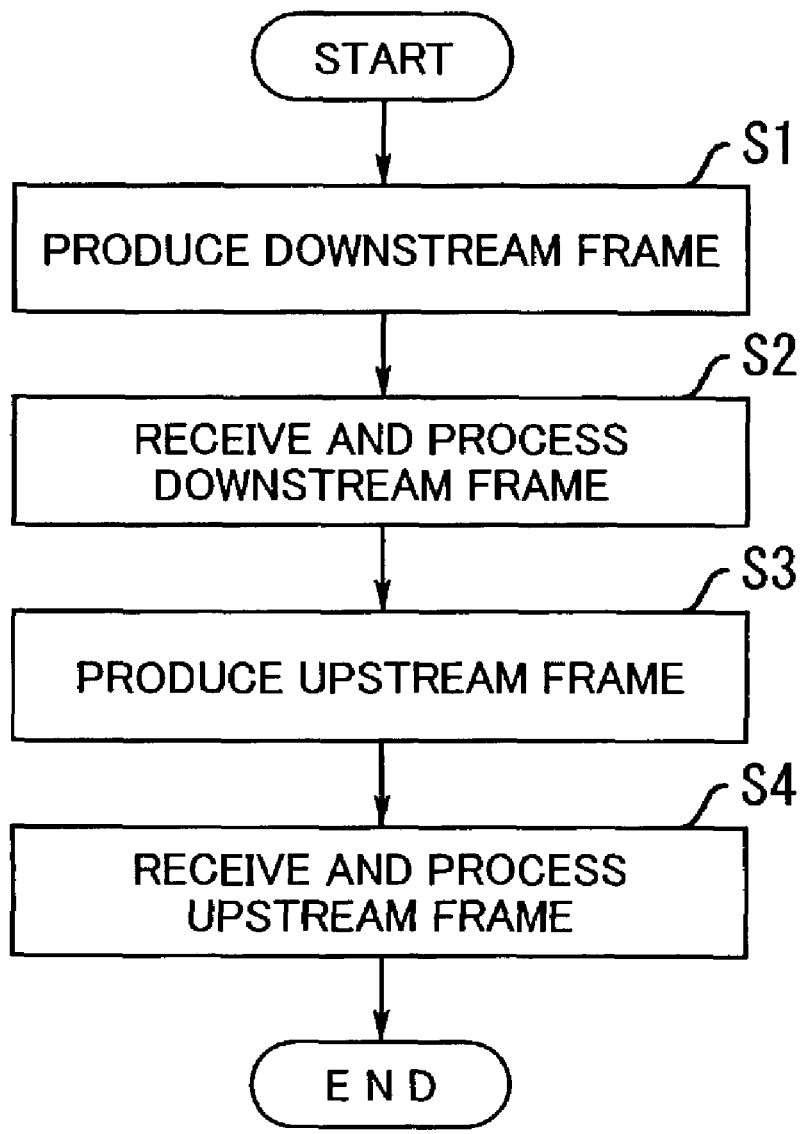
FIG. 16 is a flowchart showing a process of a communication method according to the present invention.
Figure 17:
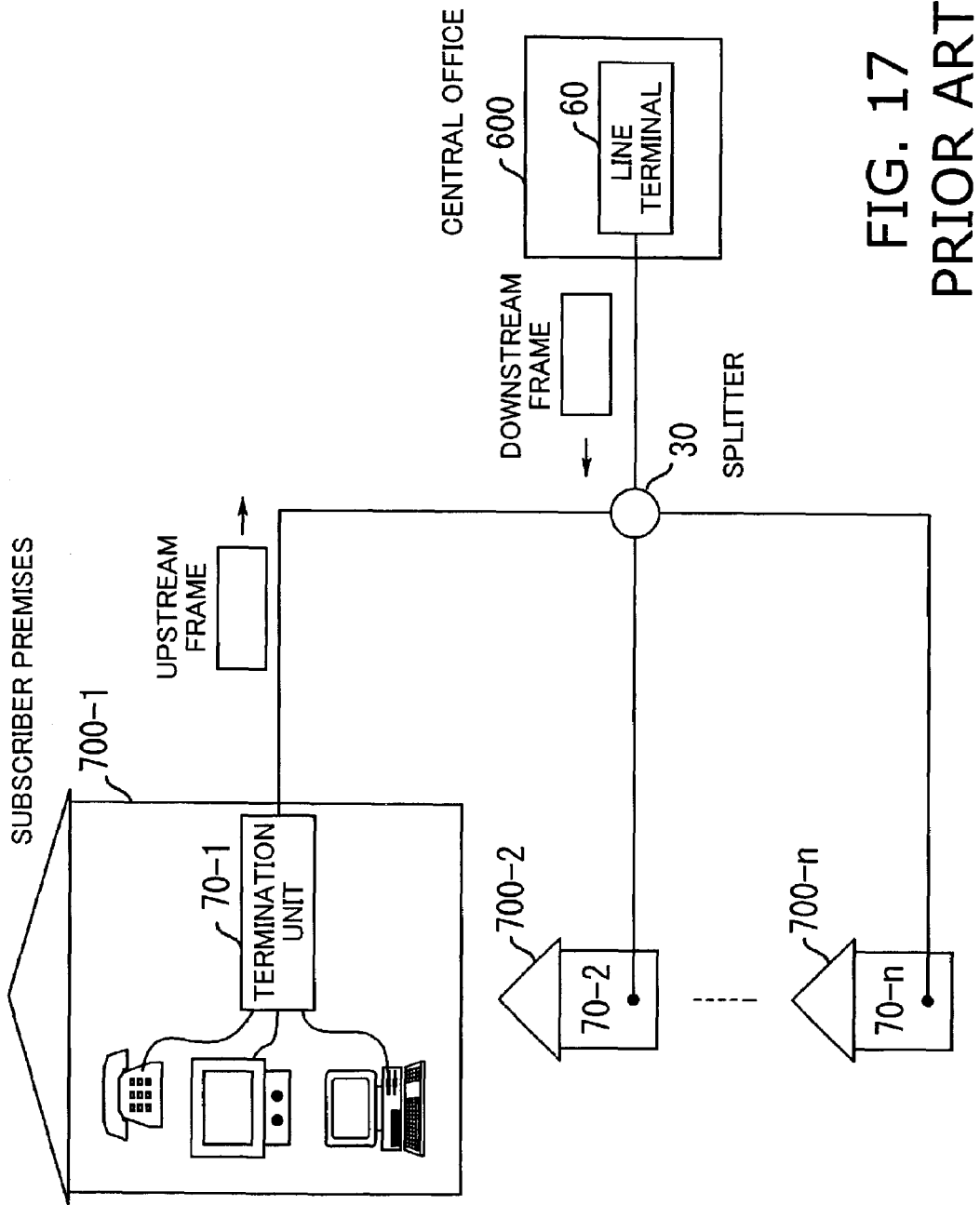
FIG. 17 is a diagram showing the structure of a subscriber access communications system.
Figure 18:
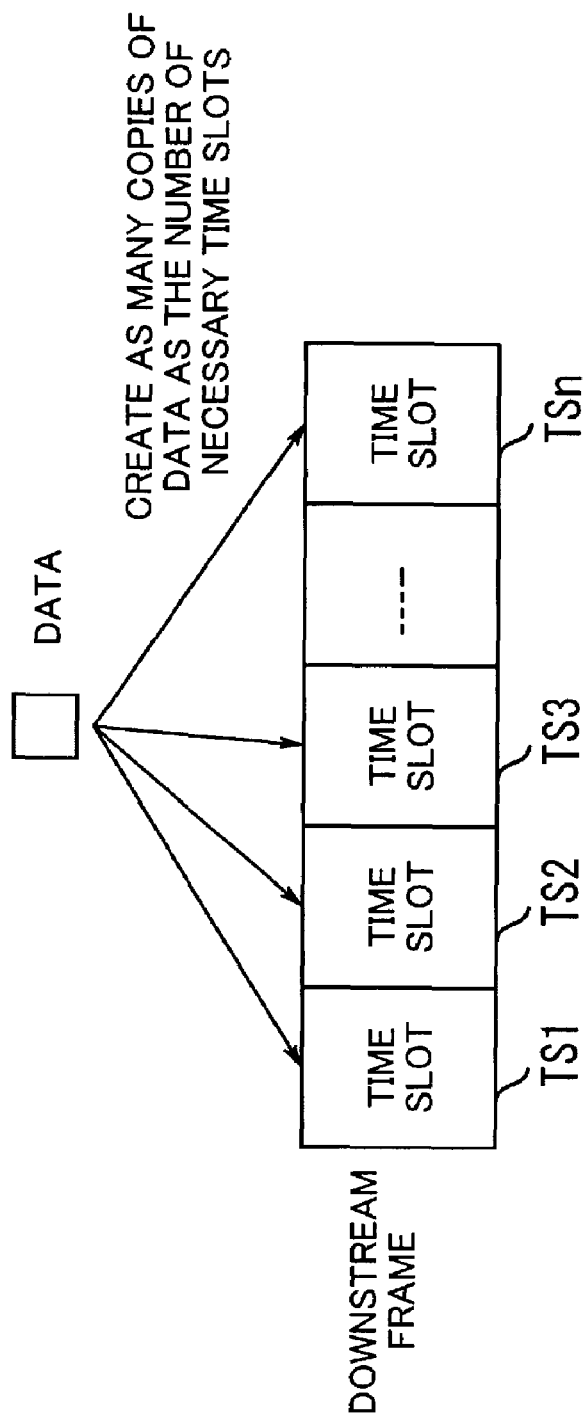
FIG. 18 is a diagram outlining a process of copying data.

Shown next is a communication method according to the present invention. FIG. 16 is a flowchart showing a process of the communication method according to the present invention.

(S1) An upper-level unit produces and sends a downstream frame for group communication, providing a group communication time slot therein.

(S2) Lower-level units receive and processes the downstream frame.

(S3) The lower-level units produce and send an upstream frame with a group communication response time slot.

(S4) The upper-level unit receives and processes the upstream frame, thereby controlling group communication processes between the upper-level and lower-level units.

More specifically, a group communication class is added to the downstream frame when it is produced. Also, a group communication response time slot and group communication response class are added to the upstream frame when it is produced.

As another option, the method may produce and send such upstream frames that contain only group communication response time slots in their data section if there is no need to perform non-group communication. As yet another option, the method may add a group communication request and a group communication request time slot to an upstream frame so that a lower-level unit will be able to request an upper-level unit to initiate a group communication session.

As we have explained above, the proposed communications system 1 and communication method are configured to control group communication processes using downstream and upstream frames produced for group communication purposes. This configuration eliminates the need for duplicating as many data instances as the number of termination units in a group, unlike conventional group communications. The present invention simplifies the processing, thus making group communication processes more efficient and flexible.

Also, the provision of a group communication class field and group communication response class field enables a plurality of group communication sessions to take place concurrently. Further, since upstream frames are configured to carry a group communication request, the termination units 20-1 to 20-n can initiate a group communication session.

While we have assumed so far a generic system for group communication, the present invention can be applied to any communications systems that have broadcast facilities. Such 1:N communications systems include, for example, radio communications systems, LANs, and optical access communications systems, such as the Asynchronous Transfer Mode-Passive Optical Network (ATM-PON). The present invention can be applied to those communications systems having broadcast functions.

As seen from the above explanations, the communications system according to the present invention is configured to control group communication processes by producing downstream frames with a group communication time slot. This arrangement eliminates the need for duplicating as many data instances as the number of termination units in a group, unlike conventional systems. The present invention simplifies the processing, thus making group communication processes more efficient and flexible.

Also, the communication method according to the present invention is configured to control group communication processes by employing a group communication time slot in downstream and upstream frames for group communication purposes. This arrangement eliminates the need for duplicating as many data instances as the number of termination units in a group, unlike conventional methods. The present invention simplifies the processing, thus making group communication processes more efficient and flexible.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communications system which enables communication between a central office and subscribers, comprising:
    a line terminal comprising:
        downstream frame generation means for producing a downstream frame for group communication, and
        office-side group communication control means for controlling group communication processes by sending the downstream frame and receiving an upstream frame; and
    a plurality of termination units, each comprising:
        upstream frame generation means for producing the upstream frame, and
        subscriber-side group communication control means for controlling the group communication processes by sending the upstream frame and receiving the downstream frame,
    wherein:
        the termination units are divided into a plurality of groups each identified by a group communication class,
        the downstream frame contains a group communication time slot for carrying data to a specified group of termination units, and
        the downstream frame carries a group communication class specifying which group of termination units is supposed to receive the data in the group communication time slot.

2. The communications system according to claim 1, wherein said upstream frame generation means adds a group communication response time slot to the upstream frame.

3. The communications system according to claim 2, wherein the upstream frame generation means produces the upstream frame whose data section consists solely of the group communication response time slot.

4. The communications system according to claim 1, wherein said upstream frame generation means adds a group communication response class to the upstream frame.

5. The communications system according to claim 1, wherein said upstream frame generation means produces the upstream frame with a group communication request field and a group communication request time slot.

6. A line terminal which communicates with termination units at a lower level, comprising:
    downstream frame generation means for producing a downstream frame for group communication; and
    office-side group communication control means for controlling group communication processes by sending the downstream frame and receiving an upstream frame from the termination units,
    wherein:
        the termination units are divided into a plurality of groups each identified by a group communication class,
        the downstream frame contains a group communication time slot for carrying data to a specified group of termination units, and
        the downstream frame carries a group communication class specifying which group of termination units is supposed to receive the data in the group communication time slot.

7. A termination unit which communicates with a line terminal at an upper level, comprising:
    upstream frame generation means for producing an upstream frame; and
    subscriber-side group communication control means far controlling group communication processes by sending the upstream frame and receiving a downstream frame sent from the line terminal,
    wherein:
        the termination unit belongs to one of a plurality of groups each identified by a group communication class,
        the downstream frame contains a group communication time slot for carrying data to a specified group of termination units, and
        the downstream frame carries a group communication class specifying which group of termination units is supposed to receive the data in the group communication time slot.

8. A communication method which enables communication between a line terminal at a central office and a plurality of termination units at subscribers, comprising the steps of:
    producing a downstream frame for group communication from the line terminal to the termination units, the downstream frame containing a group communication time slot for carrying data to a specified group of termination units;
    adding to the downstream frame a group communication class specifying which group of termination units is supposed to receive the data in the group communication time slot;
    sending the downstream frame to the terminal units;
    receiving and processing the downstream frame;
    producing and sending an upstream frame with a group communication response time slot; and
    receiving and processing the upstream frame, thereby controlling group communication processes.

9. The communication method according to claim 8, further comprising the step of adding a group communication response time slot to the upstream frame.

10. The communication method according to claim 9, further comprising the step of producing an upstream frame whose data section consists solely of the group communication response time slot.

11. The communication method according to claim 8, further comprising the step of adding a group communication response class to the upstream frame.

12. The communication method according to claim 8, further comprising the step of producing an upstream frame having a group communication request field and a group communication request time slot.

* * * * *